Jan. 18, 1966     C. D. WARE     3,229,761

SPUR TUBE WITH ALTERNATE OPPOSITELY DIRECTED ORIFICES

Filed July 5, 1963

INVENTOR.
CHESTER D. WARE

BY Holmes & Andersen

ATTORNEYS

United States Patent Office 3,229,761
Patented Jan. 18, 1966

3,229,761
SPUR TUBE WITH ALTERNATE OPPOSITELY
DIRECTED ORIFICES
Chester D. Ware, La Crosse, Wis., assignor to The Trane
Company, La Crosse, Wis., a corporation of Wisconsin
Filed July 5, 1963, Ser. No. 293,112
3 Claims. (Cl. 165—142)

This invention relates generally to heat exchangers and more particularly to condensers having vapor distributing means within the condenser tubes thereof such as for steam distribution.

In the conventional type condenser which employs steam or other condensable fluids as a heating medium, the steam is distributed in the heat exchange or condensing tubes by way of a steam distributor tube arranged inside each condensing tube. The distributor tube is normally provided with either non-directional drilled ports or unidirectional orifices in the side walls thereof which direct flow toward the outlet header. These orifices or ports may be spaced longitudinally along the distributor tube. The condensable fluid issues from each of these ports and is condensed on the interior surface of the condensing or heat exchange tubes.

It will be evident that the flow rate, within a distributor tube, will decrease progressively away from the inlet end. The relative quantity of fluid discharged per orifice decreases substantially as the flow progresses from the supply or inlet toward the outlet end of the condensing tube. Furthermore, the angle of discharge from each orifice will vary as a result of the change in kinetic energy of the fluid flowing inside the distributor tube due to the aforementioned decrease in flow rate. The net result is a substantially greater fluid discharge at the supply end, which results in higher temperatures at the supply end of the heat exchanger.

It is well known that for most efficient heat exchange design and in some cases for purposes of comfort and the like, it is desirable to have uniform temperatures across the entire face of the heat exchange coil. The aforementioned problem has been partially solved by constructing the distributor tube with progressively varying orifice spacing, orifice area, and/or tube cross-sectional area from one end of the distributor tube to the other.

However, this solution has obvious disadvantages. The nonuniform nature of the distributor tubes adds to the expense. The same tube cannot practically be used in different length installations. Finally, distributor tubes designed for uniform distribution at full load do not produce uniform distribution at other load conditions.

It is the primary object of the present invention to provide a distributor tube construction which secures uniform distribution characteristics without having the aforementioned disadvantages.

It is another object to provide a distributor tube which presents uniform distribution characteristics for uniform heat exchange temperatures.

It is a third object of the invention to provide a distribution tube that presents uniform distribution characteristics for a wide range of load conditions.

It is a further object to provide a distributor tube having the above mentioned advantages and in addition is uniform in structure resulting in economy of construction.

Still another object of this invention is to provide a distributor tube for a condenser which presents uniform distribution for a wide range of load conditions and includes adequate condensate disposal means to insure against subsequent freezing.

The full significance of these and other advantages will become more apparent as this specification proceeds to describe the invention with references to the accompanying drawing in which.

In the present invention herein disclosed, a heat exchanger distributing tube is arranged within each condensing or heat exchange tube for the purpose of distributing steam or other condensable heating medium therein. The lower portion of the distributing tube is equipped with a plurality of orifices having deflector hoods which direct the heating medium away from the supply end thereof while the upper portion is equipped with a plurality of orifices having deflector hoods which tend to direct the heating medium toward the supply end. The discharge per orifice on the lower side will decrease from the supply end to the other end. The discharge per orifice on the upper side will increase from the supply end to the other end. The combined discharge from both upper and lower orfices will be substantially uniform along the length of the tube.

Figure 1:
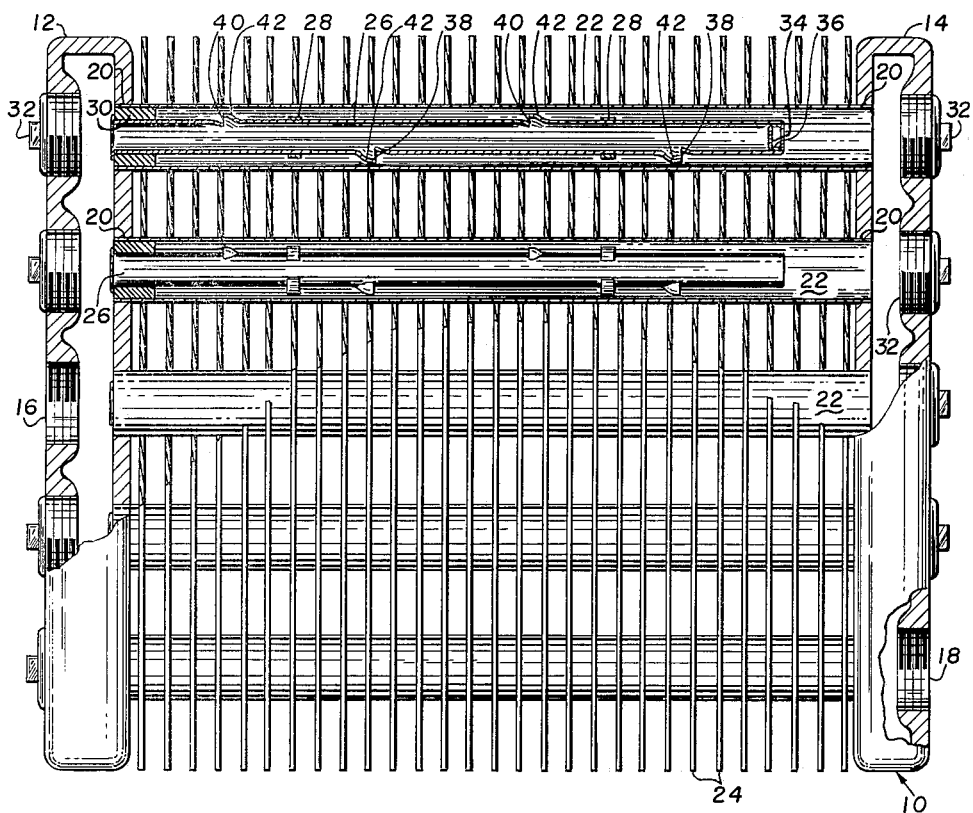
FIGURE 1 is an elevational view showing an air cooled heat exchange condenser with portions sectioned to show the interior thereof.

Looking now to FIGURE 1, heat exchanger 10 is shown as having at one end thereof a fluid inlet header chamber 12 and at the other end thereof a condensate outlet header chamber 14. Header 12 is provided with a fluid inlet port 16 and header 14 is provided with a condensate outlet port 18 for ingress and egress of the heat exchange fluid, respectively.

The inner vertical wall of each header is apertured as at 20 for receiving the ends of elongated heat exchange condensing tubes 22. Each condensing tube extends from the inlet header at one end to the condensate outlet header at the other end. The condensing tube ends are sealingly fitted in apertures 20 in any well known manner to provide fluid communication from the inlet header through the condensing tubes to the outlet header without leakage to the exterior. The outer surface of heat exchange condensing tubes 22 may be equipped with heat exchange fins 24 to enhance the heat transfer from tubes 22 to the cooling air or other heat exchange medium passing over the tubes. The heat exchanger may be supported in any attitude in any well known manner. However, to obtain full advantage of the present invention when the heat exchanger is used as a condenser, the tubes 22 should be arranged in a substantially horizontal position as will be more evident as this description proceeds.

An elongated vapor distributing tube 26 is supported as by spring clips 28 within each condensing tube 22 forming a passageway therebetween. Each distributing tube 26 extends to inlet header chamber 12 making fluid communication therewith. A bushing 30 provides a fluid seal between the distributing tube and the condensing tube at the inlet header ends thereof, thus channeling all inlet fluid first into the distributing tubes prior to delivery to the condensing tubes. It will be obvious that bushings 30 also provide support for the distributing tubes at the inlet end.

The distributing tubes 26 extend a substantial distance into condensing tubes 22. If desired, distributing tubes may project into the outlet header. In the embodiment herein shown the distributing tubes terminate somewhat short of the condensing tubes 20 at the outlet end.

Header chambers 12 and 14 may be provided with access plugs 32 in the outer walls thereof opposite apertures 20 for purposes of installation, cleaning, or repair of the tubes.

Each distributor tube 26 may be entirely closed at the end remote from the inlet end thereof or it may be provided with one or more small apertures 34 in end plug 36 for the release of entrapped condensate. It will be understood that condensate may tend to form within the distributor tube under very low or no load conditions.

Each distributor tube is further characterized as having a first row of distributor orifices 38 which extends longitudinally along the lower half side of the distributor tube in vertical alignment with the central longitudinal axis thereof. A second row of distributor orifices 40 extends longitudinally along the upper half side of the distributor tube in vertical alignment with the central longitudinal axis thereof. Each distributor tube is considered to be comprised of a plurality of longitudinally arranged tubular segments or portions each of which includes an orifice of each of said first and second rows. The number of orifices in each row may be varied according to tube length as desired.

For the purposes of simplicity only two such orifices have been shown in each row, thus presenting only two such longitudinally arranged segments or portions, i.e., the right and left halves of the exemplary distributor tube shown in FIGURE 1. Each segment or portion, having orifices facing in both directions, constitutes a self regulating distributor outlet which functions substantially independently of variations in flow velocity inside the distributor tubular segment or portion. It will be noted that the orifices of the upper row have been staggered longitudinally along the tube with respect to the orifices of the lower row.

Figures 2, 3:
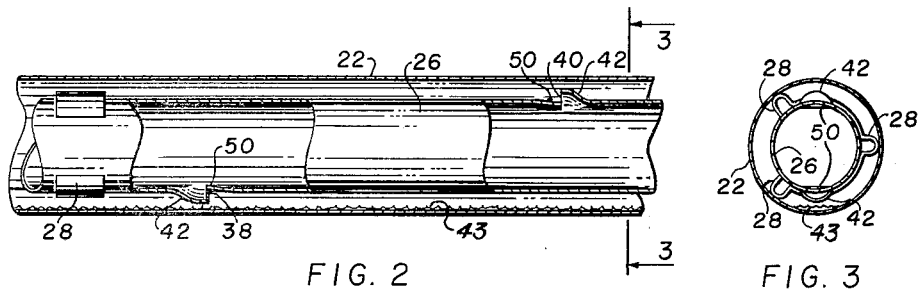
FIGURE 2 is an enlarged sectional view of a portion of a heat exchanger condensing tube and distributor tube supported therein.
FIGURE 3 is a sectional view taken at 3—3 of FIGURE 2.
Figure 4:
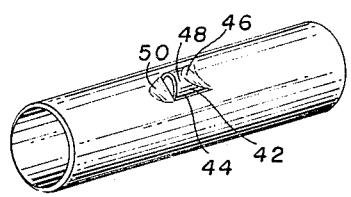
FIGURE 4 is an enlarged perspective view of a portion of the distributor tube showing a single orifice and deflector means.

Referring now more particularly to FIGURES 2–4, it should be noted that each orifice of each row of orifices is provided with a deflector hood 42 which is part of and formed from the side wall of the distributor tube. The deflector hoods of the upper row of orifices are arranged to discharge vapor in a direction generally toward the inlet end of the distributing tube while the deflector hoods of the lower row of orifices are arranged to discharge vapor in a direction generally toward the discharge or outlet end of the condensing heat exchange tubes. Having the lower orifice deflectors arranged in this manner facilitates the removal of condensate 43 from the condensing tube.

Each deflector hood is comprised of a generally semicircular substantially cylindrical portion 44 having a shorter radius than that of the distributor tube. Cylindrical portion 44 is arranged with its concave side directed toward and its axis of generation parallel to the longitudinal axis of the distributor tube. At one end, the cylindrical portion 44 terminates at its respective orifice. At the other end the cylindrical portion merges with a generally flat deflector portion 46 which extends radially outward from the periphery of the distributor tube and longitudinally toward the orifice end of said cylindrical portion. Between the orifice end of said cylindrical portion and the deflector portion is a guide portion 48 which extends in parallel relation to the distributor tube axis for importing a longitudinal direction to vapor prior to issuing from the orifice.

On the side of the orifice opposite from that of the deflector hood may be disposed a scoop 50 which may be part of and formed from the distributor tube. Scoop 50 may be substantially planar and extend radially inward from the periphery of the distributor tube and longitudinally toward the orifice. Scoops 50 facilitate directing the vapor to the lower and away from the upper orifices and may be adjusted for purposes of sizing the orifice aperture.

In the operation of the instant invention, for example, as a steam condenser, steam enters inlet port 16 and is delivered to each distributor tube 26 via inlet header chamber 12. The steam entering each distributor tube is distributed substantially uniformly along the interior surface of each condensing tube via the combined upper and lower rows of orifices. That is, while the discharge per lower orifice decreases from the supply to the return end, the discharge per upper orifice increases from the supply to the return end to establish a substantially uniform combined distribution.

Under varying load conditions, relative variations in the amount of steam issuing among the plurality of lower orifices having forwardly directed deflector hoods are counterbalanced by substantially opposite relative variations in the amount of steam issuing among the plurality of upper orifices having backwardly directed deflector hoods. In other words, if the lower orifices near the inlet end increase their flow relative to the lower orifices near the end remote from the inlet, then the upper orifices near the inlet end decrease their flow relative to the upper orifices near the end remote from the inlet. The net result is that the distribution of steam to the condenser tube remains substantially uniform for different load conditions resulting in uniform temperatures along the length of the heat exchange tubes.

The lower orifice deflector hoods also facilitate the directional movement of condensate to the outlet condensate header chamber where the condensate is discharged through outlet port 18.

Although I have described in detail the preferred embodiment of my invention, I contemplate that many changes may be made without departing from the scope or spirit of my invention, and I desire to be limited only by the claims.

I claim:

1. A heat exchanger comprising an inlet header; an outlet header; a plurality of elongated condensing tubes connected in fixed relation to and in fluid communication at one end with said outlet header; a plurality of heat exchange fins mounted on the exterior side of said condensing tubes; a plurality of elongated vapor distributor tubes each disposed at one end thereof in fluid communication with said inlet header and each extending within one of said condensing tubes; each of said distributor tubes comprising a plurality of annular portions within a condensing tube including a first annular portion and a second annular portion; said first annular portion being interposed longitudinally between said second annular portion and said one end of said distributor tube; first means forming on each of said first and second annular portions of the distributor tube therein a first orifice oriented in a direction generally for flow toward said one end of said condensing tube; and second means forming on each of said first and second annular portions of the distributor tube therein a second orifice oriented in a direction generally for flow toward that end of said condensing tube which is remote from said one end of said condensing tube, whereby said first annular portion may distribute vapor in an amount substantially equal to the amount of vapor distributed by said second annular portion in spite of variations in the total amount of vapor distributed by said distributor tube.

2. The apparatus as defined by claim 1 wherein said condensing and distributor tubes extend generally horizontally and said first means is disposed at the lower side of each of said vapor distributing tubes and said second means is disposed at the upper side of each of said vapor distributing tubes.

3. The apparatus as defined by claim 1 wherein said orifices formed by said first means are alternately longitudinally spaced with said orifices formed by said second means.

References Cited by the Examiner
UNITED STATES PATENTS

| | | | |
|---|---|---|---|
| 2,229,032 | 1/1941 | Ashley | 165—142 |
| 2,611,584 | 9/1952 | Labus | 165—176 |
| 2,858,677 | 11/1958 | Stone | 165—143 |
| 3,067,818 | 12/1962 | Ware et al. | 165—174 |

FOREIGN PATENTS 553,930  7/1955  Italy.

ROBERT A. O'LEARY, *Primary Examiner.*

CHARLES SUKALO, PERCY L. PATRICK,
*Examiners.*